United States Patent [19]

Sellsted et al.

[11] 3,862,932

[45] Jan. 28, 1975

[54] THALLIUM (I) PENICILLANATES

[75] Inventors: John H. Sellsted, King of Prussia; Daniel M. Teller, Devon, both of Pa.

[73] Assignee: American Home Products Corporation, New York, N.Y.

[22] Filed: Oct. 27, 1972

[21] Appl. No.: 301,702

[52] U.S. Cl. ............................. 260/239.1, 424/271
[51] Int. Cl. ............................................ C07d 99/16
[58] Field of Search ................................. 260/239.1

[56] References Cited
UNITED STATES PATENTS

| | | | |
|---|---|---|---|
| 2,562,410 | 7/1951 | Behrens et al. .................. | 260/239.1 |
| 2,577,699 | 12/1951 | Cooper ........................... | 260/239.1 |

FOREIGN PATENTS OR APPLICATIONS

| | | | |
|---|---|---|---|
| 73,100 | 8/1953 | Netherlands .................... | 260/239.1 |

OTHER PUBLICATIONS

Taylor et al., Journal of American Chem. Soc., 90, p. 2422–2423, 1968

*Primary Examiner*—Nicholas S. Rizzo
*Assistant Examiner*—Mary C. Vaughn
*Attorney, Agent, or Firm*—Richard K. Jackson

[57] ABSTRACT

Thallium (I) penicillanates are uniquely adaptable for synthetic production of penicillanic acid anhydrides of mixed and symmetrical derivation. The penicillanic acid anhydrides are valuable as intermediates in the production of known penicillin derivatives as well as in the repository antibiotic administration.

2 Claims, No Drawings

THALLIUM (I) PENICILLANATES

BACKGROUND OF THE INVENTION

The reaction of thallium (I) salts of carboxylic acids with acyl halides in the production of both mixed and symmetrical anhydrides is disclosed by Taylor et al., J.A.C.S., 90, pp. 2422-2423 (1968). The production and use of mixed anhydrides of penicillanic acids is disclosed by Cooper in U.S. 2,577,699.

BRIEF DESCRIPTION OF THE INVENTION

In accordance with this invention there is provided thallium (I) salts of penicillanic acids and a process for their use in the production of mixed and symmetrical anhydrides.

More specifically, the present invention provides compounds of the formula:

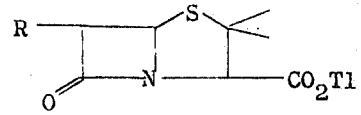

in which R is selected from the group consisting of:

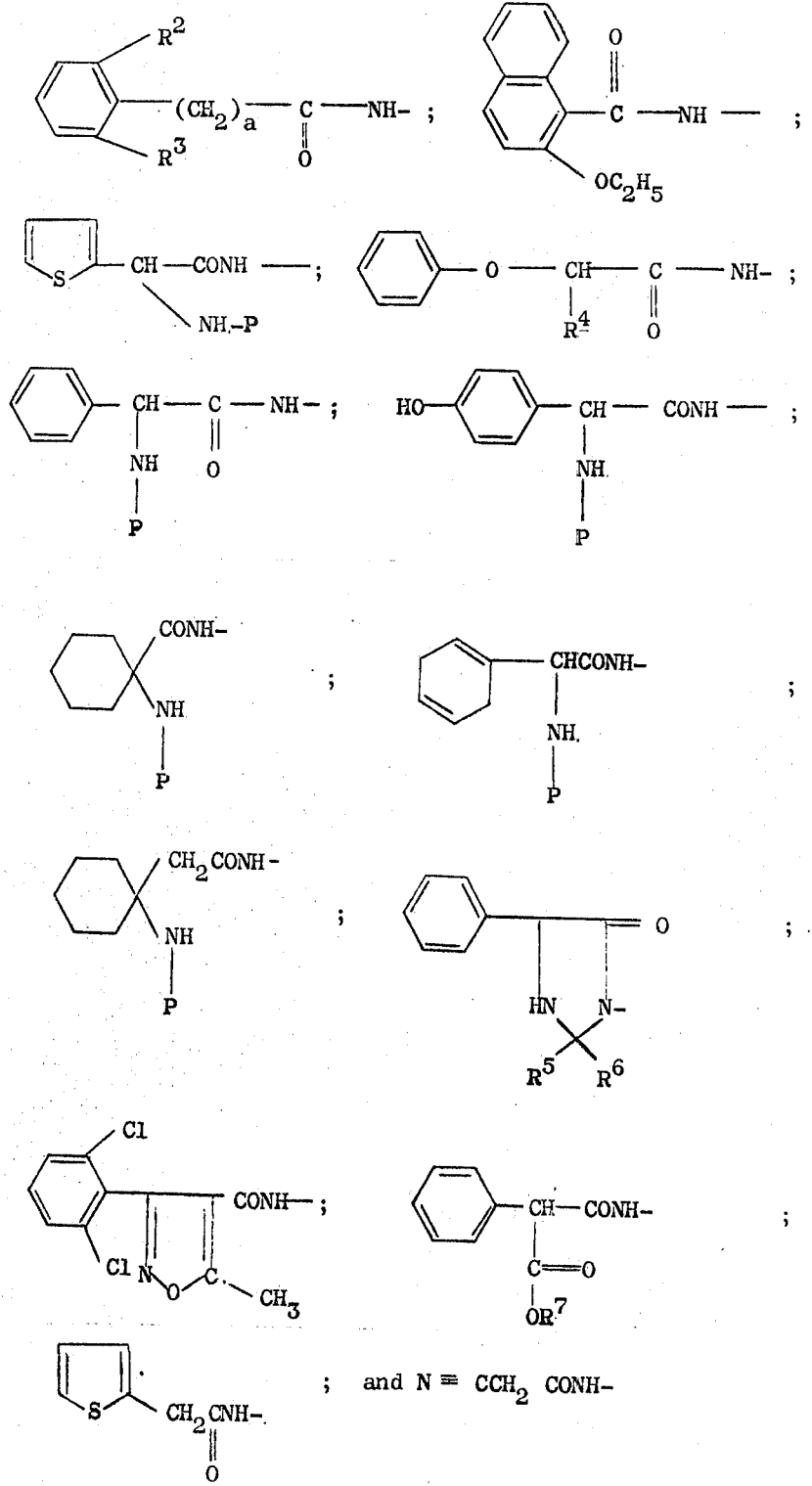

wherein

R² and R³ are selected from the group consisting of hydrogen and lower alkoxy; R⁴ is selected from the group consisting of hydrogen, lower alkyl and phenyl; R⁵ and R⁶ when taken separately are selected from the group consisting of hydrogen and lower alkyl, and when taken together with the carbon atom to which they are attached, complete a ring selected from the group consisting of cycloalkyl containing from about 4 to about

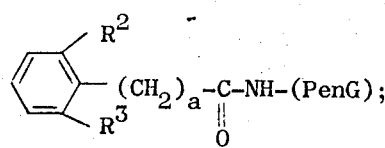

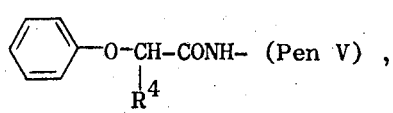

and Schiff bases formed from such reactants as ethylacetoacetate and pentane-2,4-dione.

Within the group of thallium (I) penicillanates described above are those preferred as intermediates for production of mixed anhydrides which are most desirable from the standpoint of production economics and activity. Those preferred compounds are represented by the preceding structural formula where R is selected from the group consisting of

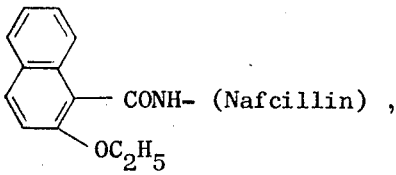

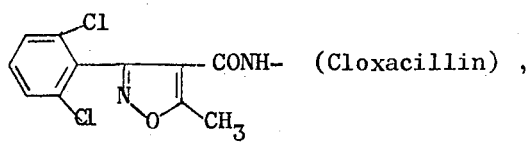

and 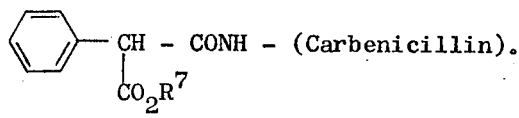

8 carbon atoms and piperidine; R⁷ is lower alkyl or cycloalkyl of 4 to 8 carbon atoms, mesyl or 2,6-

The salts described in this invention may be prepared by the following reaction scheme.

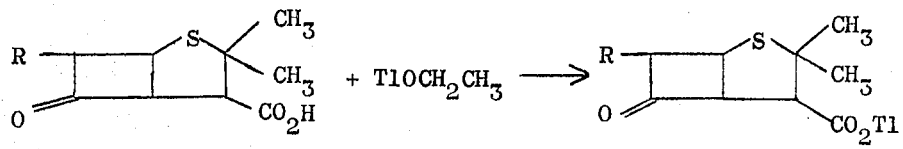

dimethoxy phenyl; a is one of the integers 0 and 1 and P is a commonly used, easily removable protecting The anhydrides are produced from the thallous penicillanates by the following general reaction scheme.

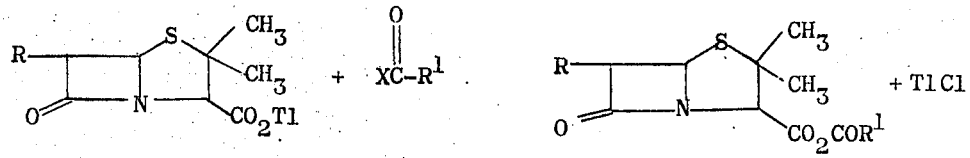

group for an amino substituent.

Illustrative examples of protective groups for amino substituents are described by Boissonnas, Advances In Organic Chemistry, vol. 3, (1963) pp. 159–190; McOmie, ibid, pp. 203–210, 273; Patchornik et al., J.A.C.S., vol. 92, pp. 6333–6335, 1970. Of those described in the prior art, the protective groups most amenable to use in the preparation of the compounds of this invention are of the oxycarbonyl type, represented more specifically by the 6-nitroveratryloxycarbonyl, 2-nitrobenzyloxycarbonyl, 4-nitrobenzyloxycarbonyl 2,2'-dinitrodiphenylmethyloxycarbonyl, benzyloxycarbonyl, t-butyloxycarbonyl and trichloroethoxycarbonyl group; the phenylsulfenyl type, represented by the o-nitrophenylsulfenyl and p-methoxy-o-nitrophenysulfenyl groups; the triphenylmethyl group in which the group R has the aforesaid meaning, R¹ is the residue of the acyl halide and X is a halogen such as chlorine, bromine or iodine.

Throughout this specification, the term lower alkyl is conventionally used to encompass straight and branched chain alkyl groups containing from 1 to about 7 carbon atoms, e.g. methyl, ethyl, propyl, isopropyl, butyl, isobutyl, pentyl, 2-ethyl propyl, hexyl, 2-propyl propyl, and the like. Similarly, the term lower alkoxy is used to encompass straight and branched chain groups containing from 1 to about 7 carbon atoms.

In the production of symmetrical anhydrides of a penicillanic acid, an alternate route to that of the reaction of thallium penicillanate with the same penicillanic acid halide, involves the reaction of the thallium (I) penicillanate with thionyl chloride to produce the intermediate diacyl sulfite which spontaneously loses sulfur dioxide to afford the desired symmetrical anhydride. The following equation exemplifies this reaction:

ence of diethyl ether to pH 2. The layers are separated and the aqueous layer extracted again with diethyl ether. The ether is washed with brine and dried with

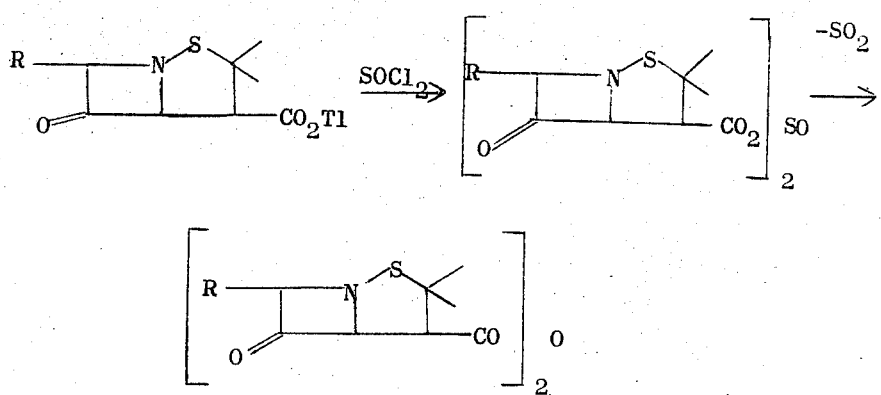

in which R has the definition previously given.

In the production of thallium penicillanates, applicants have surprisingly discovered that the nucleophillic properties general ascribed to metal alkoxides, are not sufficient in thallium (I) alkoxides (thallium ethoxide) to open the β-lactam moiety of the penicillanic acid structure. Thus, unexpectedly, thallium alkoxides may be used to produce thallium penicillanates without destruction of the heterocyclic nucleus to an untoward degree.

During the reaction of the thallium penicillanate with an acyl halide, applicants have found that the thallium chloride salt produced is readily separable from the anhydride product, thereby removing from the pharmaceutical preparation the presence of thallium salts, known to be extremely toxic biologically. Thus, it is preferred, to assist in the removal of thallium salts during the preparation of a symmetrical or mixed anhydrides, to employ a solvent in which the produced thallium halide is insoluble. The preferred solvents are ethers such as diethyl ether or diisopropyl ether, while in general, the lower aliphatic ethers are acceptable reaction media.

The following specific examples presented by way of illustration, are not to be interpreted as limitations upon the invention claimed.

EXAMPLE 1

Thallium Penicillin V

Penicillin V acid (3.50 g, 0.01 mole) is dissolved in 15 ml tetrahydrofuran and thallium ethoxide (2.49 g, 0.01 mole) dissolved in 5 ml. of tetrahydrofuran is added over 10 minutes, giving an orange precipitate that changed to white. The mixture is filtered and the solid is washed with cold tetrahydrofuran and diethyl ether, giving 2.6 g, mp. 197°C. (dec). The solid is recrystallized from isopropanol-water, mp. 189°C. (dec).
Elemental Analysis for $C_{16}H_{17}N_2O_5STl$
  Calculated: C, 36.70; H, 3.07; N, 5.06; S, 5.79.
  Found: C, 35.49; H, 3.16; N, 5.07; S, 5.40; $H_2O$, 2.40.

EXAMPLE 2

Thallium Penicillin G

Potassium penicillin G (41.0 g, 0.1 mole) is dissolved in 500 ml cold water and acidified at 0.5°C. in the pres- $MgSO_4$. Thallium ethoxide (24.9 g, 0.1 mole) is slowly dripped into the ether solution after filtering off the $MgSO_4$. The precipitate is collected and washed with diethyl ether, and dried at 40°C. in vacuo.
Elemental Analysis for $C_{16}H_{17}N_2O_4STl$
  Calculated: C, 35.73; H, 3.19; N, 5.20; S, 5.95.
  Found: C, 36.43; H, 3.47; N, 7.22; S, 6.16.

EXAMPLE 3

6-(2-Phenoxyacetamido)penicillanic acid anhydride with pivalic acid.

A suspension of thallium penicillin V (0.01 mole, 5.54 g) in diethyl ether (125 ml) containing pivaloyl chloride (0.01 mole, 1.20 g) is stirred under nitrogen for 19 hours. The mixture is filtered and the filtrate is stripped in vacuo < 30°C. The solid residue is triturated with diethyl ether giving 1.53 g of colorless product; mp. 119°–121°C.; homogeneous on thin layer chromatography.
Elemental Analysis for $C_{21}H_{26}N_2O_6S$
  Calculated: C, 58.05; H, 6.05; N, 6.45; S, 7.37.
  Found: C, 57.20; H, 6.33; N, 6.46; S, 7.78.

What is claimed is:

1. The compound which is

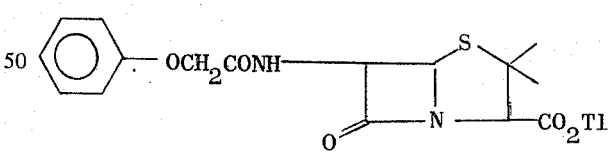

2. The compound which is

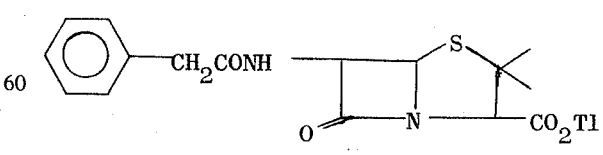

* * * * *